United States Patent
De Lemos Junior et al.

(10) Patent No.: US 11,846,369 B2
(45) Date of Patent: Dec. 19, 2023

(54) MONITORING SQUEEZE PRESSURE OF TRACK TENSIONERS

(71) Applicant: Subsea 7 do Brasil Servicos Ltda, Rio de Janeiro (BR)

(72) Inventors: Luiz Carlos De Lemos Junior, Rio de Janeiro (BR); Marcelo Aguiar Camara, Rio de Janeiro (BR); Flavio Lage Bormann, Rio de Janeiro (BR)

(73) Assignee: SUBSEA 7 DO BRASIL SERVICOS LTDA, Rio de Janeiro (BR)

( * ) Notice: Subject to any disclaimer, the term of this patent is extended or adjusted under 35 U.S.C. 154(b) by 0 days.

(21) Appl. No.: 17/611,516

(22) PCT Filed: May 13, 2020

(86) PCT No.: PCT/BR2020/050161
§ 371 (c)(1),
(2) Date: Nov. 15, 2021

(87) PCT Pub. No.: WO2020/227795
PCT Pub. Date: Nov. 19, 2020

(65) Prior Publication Data
US 2022/0205558 A1  Jun. 30, 2022

(30) Foreign Application Priority Data
May 15, 2019  (GB) ...................... 1906860

(51) Int. Cl.
*F16L 1/23* (2006.01)
*B63B 35/03* (2006.01)
*F16L 1/20* (2006.01)
*G01L 5/10* (2020.01)

(52) U.S. Cl.
CPC ................. *F16L 1/23* (2013.01); *B63B 35/03* (2013.01); *F16L 1/207* (2013.01); *G01L 5/10* (2013.01)

(58) Field of Classification Search
CPC .. F16L 1/23; F16L 1/207; B63B 35/03; G01L 5/10
See application file for complete search history.

(56) References Cited

U.S. PATENT DOCUMENTS

| | | | |
|---|---|---|---|
| 3,658,222 A | 4/1972 | Dressel et al. | |
| 3,669,329 A | 6/1972 | Blanchet et al. | |
| 3,739,971 A | 6/1973 | Silvestri et al. | |
| 5,573,353 A * | 11/1996 | Recalde | F16L 1/19 405/168.4 |
| 5,718,538 A | 2/1998 | Recalde | |

(Continued)

FOREIGN PATENT DOCUMENTS

| | | |
|---|---|---|
| CN | 201636435 | 11/2010 |
| CN | 201844115 | 5/2011 |

(Continued)

*Primary Examiner* — Kyle Armstrong
(74) *Attorney, Agent, or Firm* — Mattingly & Malur, PC (57) ABSTRACT

A tensioner system holds back elongate products such as subsea pipelines being laid into water. The system comprises at least one endless circulatory track and an array of rollers supporting the track. Each of the rollers of the array is mounted for rotation around a respective shaft. At least one of the shafts comprises a load pin that is arranged to sense loads applied to the surrounding roller in directions normal to an axis of rotation of that roller.

17 Claims, 8 Drawing Sheets

(56) References Cited

U.S. PATENT DOCUMENTS

| | | | |
|---|---|---|---|
| 6,439,445 B1 | 8/2002 | De Groot et al. | |
| 2003/0219313 A1* | 11/2003 | Giovannini | B63B 1/107 |
| | | | 405/166 |
| 2018/0339891 A1* | 11/2018 | Ijadi-Maghsoodi | B66F 17/00 |
| 2021/0116051 A1 | 4/2021 | Harrop et al. | |

FOREIGN PATENT DOCUMENTS

| | | |
|---|---|---|
| CN | 102182868 | 9/2011 |
| CN | 202056412 | 11/2011 |
| CN | 102494190 | 6/2012 |
| CN | 102910432 | 2/2013 |
| CN | 204264911 | 4/2015 |
| FR | 2964441 | 3/2012 |
| FR | 2964441 | 8/2012 |
| GB | 2011011 | 7/1979 |
| GB | 2561375 | 10/2018 |
| WO | WO 98/50719 | 11/1998 |
| WO | 2009/088287 | 7/2009 |
| WO | WO 2018/189567 | 10/2018 |

* cited by examiner

MONITORING SQUEEZE PRESSURE OF TRACK TENSIONERS

This invention relates to techniques for monitoring the squeeze pressure exerted by track-type tensioners upon a subsea pipeline during its installation from a surface vessel.

The invention will be exemplified in this specification with reference to subsea pipelines. However, in principle, the invention could also be used when installing other elongate subsea elements, such as risers or umbilicals.

Various methods are known in the subsea oil and gas industry for installing rigid and flexible pipelines offshore, most commonly the methods known in the art as S-lay, J-lay and reel-lay. In each case, the pipeline hangs as a catenary between the installation vessel and the seabed under the tension of self-weight.

The suspended weight of the catenary is supported by a system aboard the vessel that applies hold-back force to the pipeline. Conventionally, a hold-back system comprises a bushing that engages the pipeline mechanically or a clamp or tensioner that squeezes the pipeline to grip the pipeline frictionally. When laying large-diameter pipelines in deep water, a hold-back system may support a weight load of several hundred metric tons.

The invention is particularly concerned with hold-back systems that comprise track tensioners. In such tensioners, endlessly-looped articulated belts or caterpillar-type tracks squeeze the pipeline between them to hold back the suspended weight of the pipeline. There are at least two such tracks in mutual opposition about the pipeline. Tensioner arrangements with three or four tracks equi-angularly spaced around the firing line or launch axis of the pipeline are also common.

In each case, the tracks of a tensioner turn in longitudinally-extending planes that intersect the central longitudinal axis of the pipeline. This defines elongate interface areas extending parallel to the pipeline where the tensioners are pressed inwardly into contact with the outer surface of the pipeline.

Figure 1:
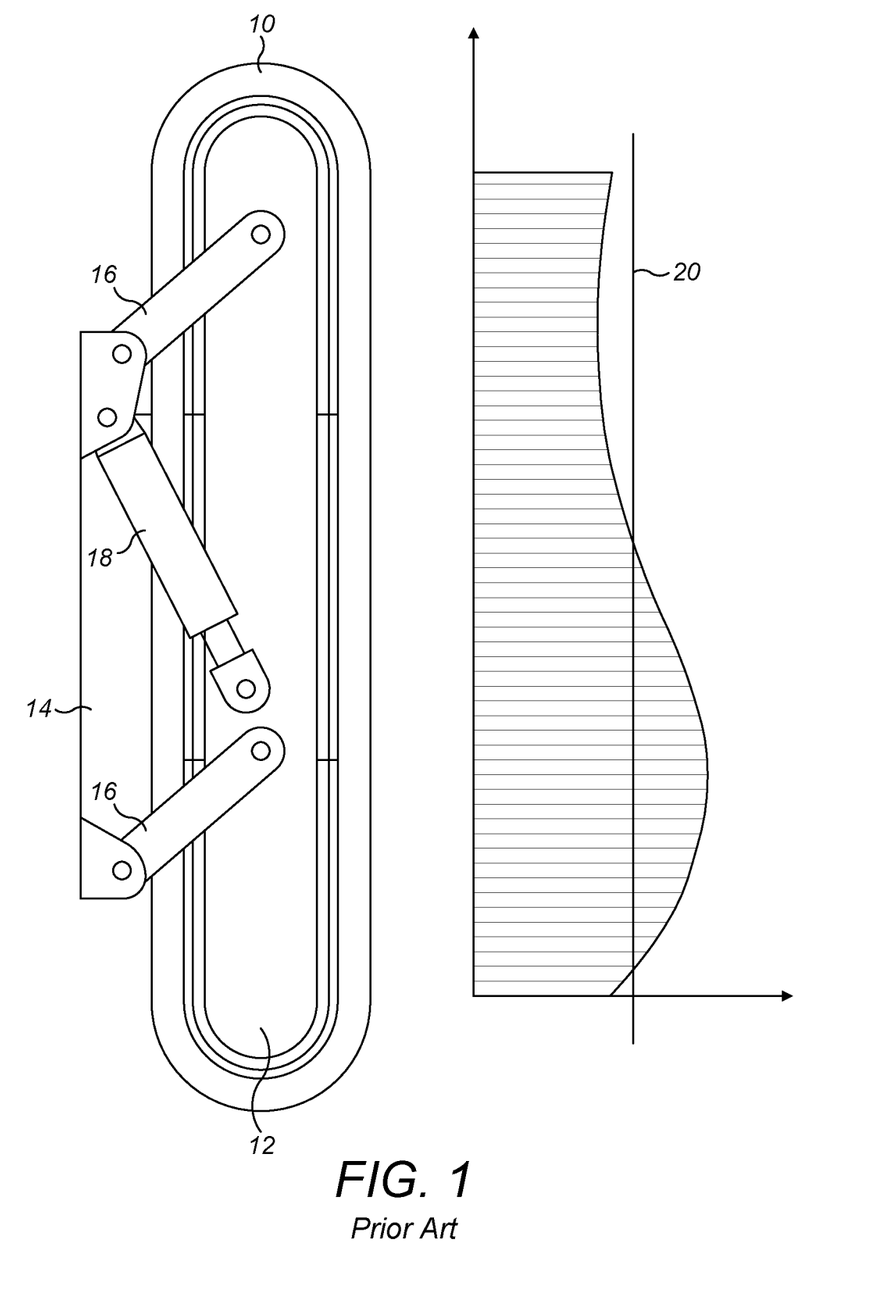
FIG. 1 is a schematic side view of a conventional tensioner track supported by a chassis that is mounted to a support structure via hydraulic cylinders, and further includes a graph of typical squeeze force distribution along the length of the track.

WO 98/50719 exemplifies the use of a jack system to displace the tracks and to apply squeeze pressure to a pipeline. A similar arrangement is also illustrated in FIG. 1 of the drawings. The left side of FIG. 1 shows one of the tracks 10 of a tensioner supported by a frame or chassis 12 that is connected to a support structure 14 by swinging arms 16 that define a parallelogram linkage. Hydraulic cylinders 18, only one of which is shown in FIG. 1, also extend between the support structure 14 and the chassis 12. Thus, the chassis 12 is movable relative to the support structure 14 by the hydraulic cylinders 18, which lengthen to move the track 10 into engagement with a pipeline as the arms 16 of the linkage pivot in unison.

Forces exerted on the chassis 12 by the hydraulic cylinders 18 generate the squeeze force that is exerted on the pipeline by the track 10. Thus, tensioner systems like that described in WO 98/50719 and shown in FIG. 1 work by the hydraulic cylinders 18 of a jack system applying squeeze pressure to control loads within the tensioner during operation. The squeeze pressure is controlled by a supervisory control and data acquisition (SCADA) system.

FIG. 1 also shows, to the right side, a typical distribution of squeeze force along the length of the interface area defined by the track 10. Specifically, the vertical axis represents the longitudinal position along the length of the interface area shown on the track 10 to the left of FIG. 1. The horizontal axis represents the squeeze force per unit length of the interface area. It will be noted that the squeeze force tends to vary either side of an average value 20, from values beneath the average value 20 in the upper portion of the interface area to values above the average value 20 in the lower portion of the interface area.

Hold-back force is applied by static friction between the outer surface of a pipeline, typically defined by a polymer coating or polymer outersheath of the pipeline, and pads mounted on the tracks 10. The pads are usually made of a conforming, resilient material to improve their grip on the pipeline. However, the pads could instead be made of a rigid material such as steel, in which case they may be provided with high-friction surface formations such as ridges.

The tracks 10 carrying the pads are driven to circulate around a continuous, endless loop to displace the pipeline longitudinally. A typical track tensioner is disclosed in U.S. Pat. No. 3,739,971. Typical pad arrangements are disclosed in U.S. Pat. No. 3,669,329 and are also shown in FIG. 2.

Figure 2:
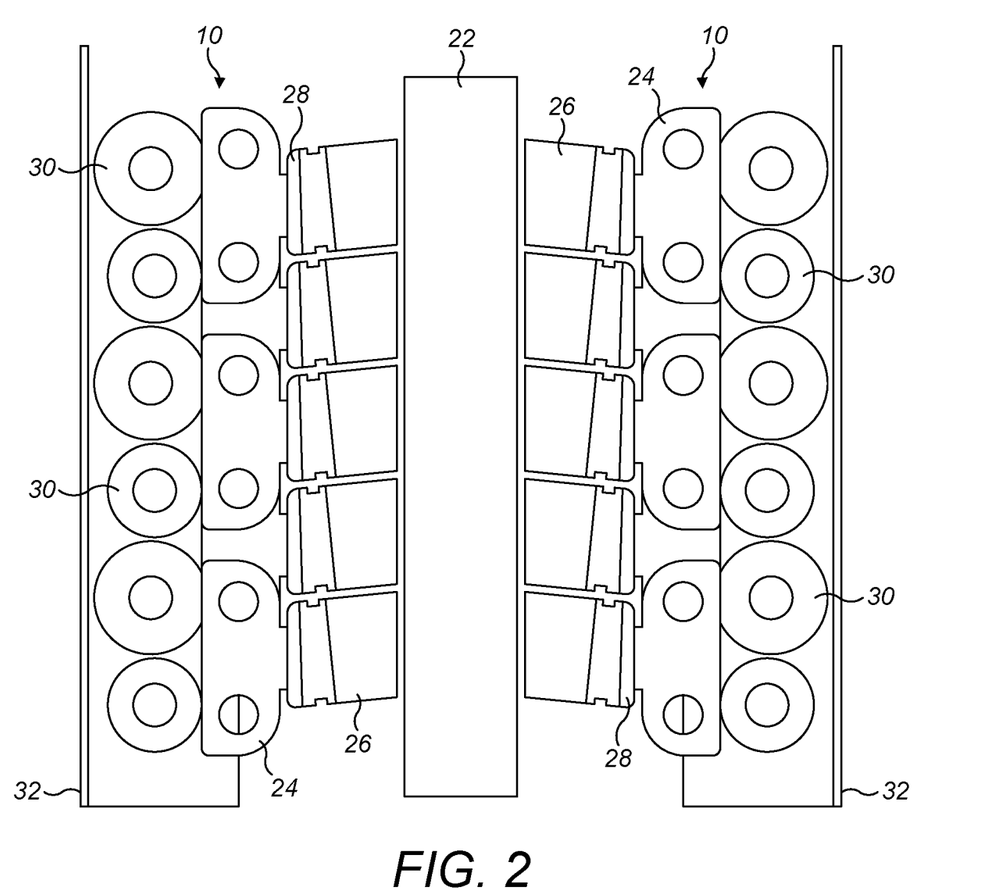
FIG. 2 is a schematic detail side view of opposed tensioner tracks of a tensioner of the invention, shown gripping a pipeline between their respective series of pads.

FIG. 2 is a detail view that shows two tensioner tracks 10 in mutual opposition about a pipeline 22 squeezed between them. It will be apparent that the chain of articulated track elements or links 24 that supports pads 26 on respective back plates 28 circulates on an array of supporting rollers 30 that extends along the length of the interface area.

Alternating rollers 30 of the array appear to be of greater radius than the other, interspersed rollers 30 of the array when viewed from the side. This is because the apparently larger-radius rollers have optional guide flanges at their ends, as best appreciated in FIGS. 5 and 7, for keeping the tracks 10 on a planar path. In reality, all of the rollers 30 have substantially the same rolling radius where they are in supporting contact with the track 10.

The rollers 30 of the array are supported by respective track bodies 32, being parts of the structure of the chassis 12 shown in FIG. 1. The rollers 30 of the array turn on respective parallel axes that are orthogonal to, and lie in a plane parallel to, the central longitudinal axis of the pipeline 22. An improvement of such a roller system is disclosed in FR 2964441.

The rollers 30 of the array turn on parallel and co-planar axes around respective rods or shafts 34 supported by the track body. The rollers 30 are tubular, each defining a central lumen that receives one of the shafts 34 coaxially. The shafts 34 thereby serve as spindles for the rollers 30.

Figure 3:
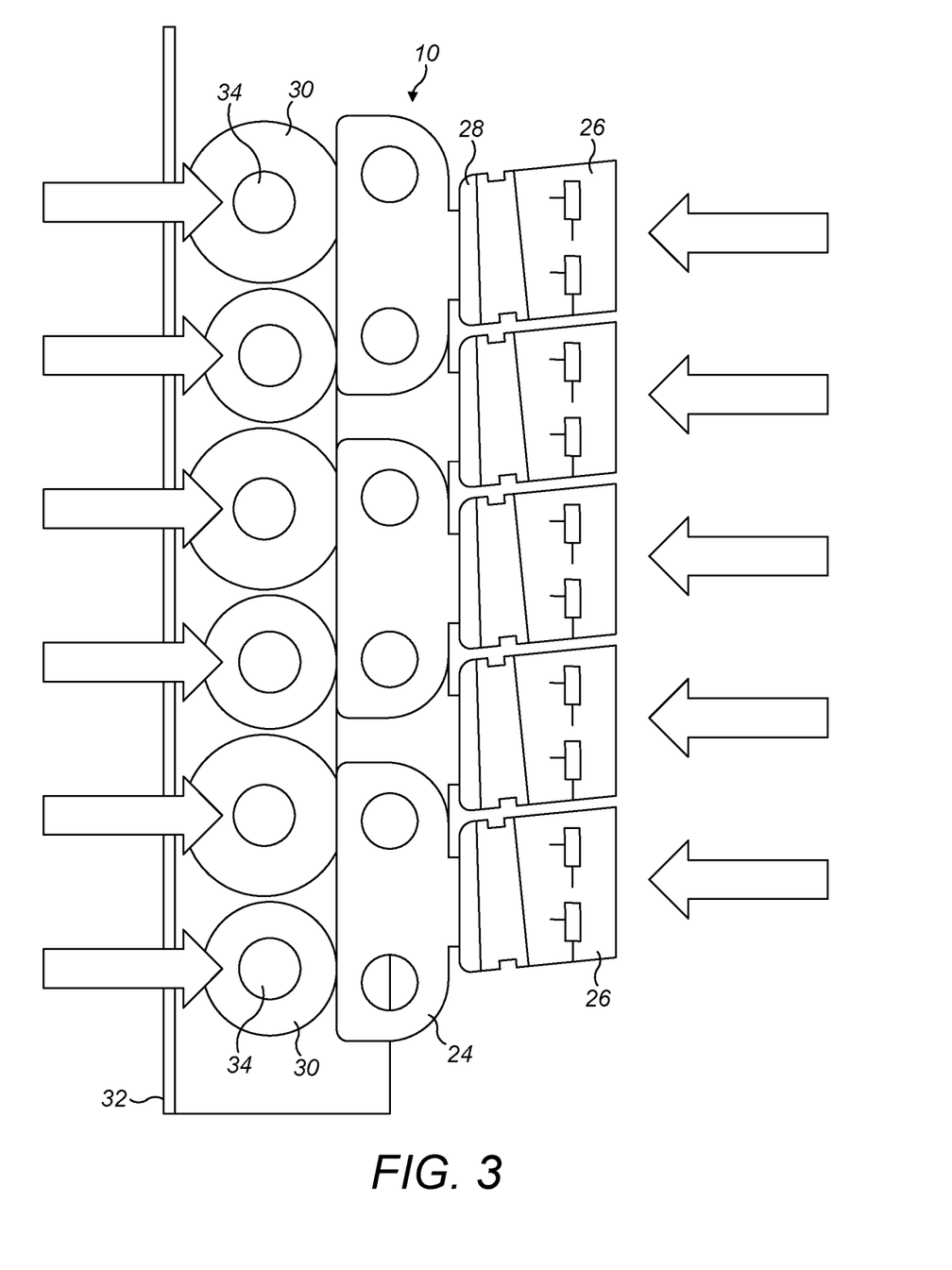
FIG. 3 is a schematic enlarged detail view of one of the tensioner tracks shown in FIG. 2, showing loads and reaction forces acting on the tracks via the pads and supporting rollers.

FIG. 3 is an enlarged view of one of the tracks 10 of FIG. 2, showing the balance between inward squeeze forces and outward reaction forces. The track 10 transmits those forces between the array of rollers 30 and the pads 24 that form the interface area with the pipeline 22 shown in FIG. 2.

In broad structural terms, tensioners of the invention are substantially conventional. Indeed, it is an advantage of the invention that minimal adaptation to conventional tensioners is necessary, and that a pre-existing tensioner can therefore be retro-fitted easily to be reconfigured in accordance with the invention. Thus, whilst FIGS. 2 and 3 show some aspects of tensioners of the invention, they are also useful to illustrate the main structural features of conventional tensioners.

Typically, tensioners exert squeeze forces of about one hundred and fifty metric tons per metre of track along the interface area. As a metre of track is typically supported by five rollers, it follows that each roller will typically carry a load of about thirty metric tons.

Maintaining static friction between a tensioner and a pipeline is essential. Once it begins, slippage of a pipeline within and with respect to the tensioner is almost impossible to arrest. Slippage of a pipeline therefore presents a risk of serious injury to personnel on board the installation vessel, and a likelihood of catastrophic damage to the pipeline and to equipment of the vessel near the firing line.

Consequently, where a tensioner is used to apply hold-back force to a pipeline, key parameters to be monitored during the pipelay operation are:
- top tension, which is the longitudinal or axial force applied to the tensioner by the suspended weight of the catenary; and
- squeeze pressure exerted by the tensioner, which is a major factor in the resistance of static friction to slippage of the pipeline relative to the tensioner.

In existing tensioner systems, all parameters required to confirm and check the squeeze force applied to the pipeline are measured indirectly from hydraulic pressure variation and from the geometry and positioning of the tracks. Even the outer diameter of the pipeline is measured only indirectly during application of squeeze forces.

Manufacturers of tensioners and clients for subsea pipeline installations usually specify a maximum allowable squeeze force variation of ±10%. There is therefore a need for an instrumented control system that can check the squeeze force continuously and anticipate any adjustments that may be required during operation.

As described in U.S. Pat. No. 3,658,222, top tension and/or squeeze pressure are conventionally monitored by one or two load cells inserted into respective pin interfaces between a frame of the tensioner and its support. Such load cells are also known in the art as load pins. Alternatively, or in combination, squeeze pressure may be measured by monitoring hydraulic pressure in the hydraulic cylinders of jacks that act on the tracks of a tensioner.

Monitoring top tension and squeeze pressure by the method described in U.S. Pat. No. 3,658,222 is simple and efficient as far as it goes, but it cannot provide load data in enough detail to anticipate all potential problems. Consequently, WO 2018/189567 proposes an alternative monitoring method in which load cells are installed in one or more of the individual pads of the tensioner tracks or in the supporting back plates of those pads.

Whenever a pipeline is being lowered or raised by a tensioner, the pads must circulate around the track away from and then back to the interface between the track and the pipeline. Consequently, each individual pad cannot always be in contact with the pipeline. It follows that a solution like that proposed in WO 2018/189567 cannot monitor the squeeze pressure consistently unless all or most of the pads or their back plates are instrumented. It is also necessary for signals from the load cells in the pads or the back plates to be communicated wirelessly to a monitoring system. The necessary electronics must therefore be self-contained in each pad or back plate, together with a battery as a source of electrical power. Also, strain gauges may be challenging to mount in resilient pads. All of these factors add complexity and reduce reliability.

CN 202056412 shows a further example of a pipeline tensioner system and CN 201844115 shows an example of a support roller for use in S-lay pipelaying.

It is against this background that the present invention has been devised. In one sense, the invention provides a tensioner system for holding-back elongate products being laid into water. The system comprises: at least one endless circulatory track; and an array of rollers supporting the or each track, each of the rollers of the array being mounted for rotation on a respective shaft. At least one of the shafts comprises a load pin that is arranged to sense loads applied to a surrounding roller of the array in directions normal to an axis of rotation of that roller.

The shafts are supported by a chassis structure and the or each load pin is fixed relative to the chassis structure. Conveniently, this allows the or each load pin to be hard-wired to a processor that is arranged to process load signals from the load pin and to output the processed signals to a tensioner control system. Similarly, the processor may be integrated with, or hard-wired to, the tensioner control system.

The or each load pin suitably extends between mutually-spaced walls of the chassis structure and may protrude outwardly beyond interfaces between the surrounding roller and the walls, at opposed ends of that roller. In that case, the or each load pin may comprise circumferential grooves aligned with the interfaces between the surrounding roller and the walls. Also, the or each load pin may comprise strain gauges that are aligned with the interfaces between the surrounding roller and the walls. The strain gauges may, for example, be disposed within a bore that extends longitudinally along the load pin.

As an auxiliary measure, the or each track may be mounted on a frame that incorporates one or more additional load pins arranged to sense loads applied to the frame.

The inventive concept also embraces a method of monitoring a tensioner system when holding-back elongate products being laid into water. The method comprises sensing loads applied to at least one roller that supports an endless circulatory track, the loads being applied in directions normal to an axis of rotation of that roller. In accordance with the invention, the loads are sensed by at least one load pin on which the or each roller is mounted for rotation. The method further comprises advancing the track while the or each roller rotates and the or each load pin remains in fixed relation to a supporting chassis structure.

Shear forces may be applied to the or each load pin by virtue of force applied to a central portion of the load pin and opposing forces applied to end portions of the load pin. For example, the force applied to the central portion of the load pin may be applied by the surrounding roller. Also, the opposing forces applied to the end portions of the load pin may be applied by mutually-spaced supporting formations, such as walls that are integral with or fixed to a chassis structure.

Advantageously, the track is advanced while the or each roller rotates and the or each load pin remains in fixed relation to a supporting chassis structure. Conveniently, therefore, load signals may be conveyed from the or each load pin to a processor through a wired connection. Then, after processing the load signals, the processed signals may be output to a tensioner control system. The processed signals may also be output to the tensioner control system through a wired connection.

The method of the invention may involve sensing individual loads applied to an array of multiple rollers extending along the track. For example, the individual loads may be recorded to determine a distribution of squeeze forces along the track. The individual loads may also be recorded to determine deviations in the outer diameter of a product passing through the tensioner system while being laid.

The inventive concept extends to an installation vessel that comprises the tensioner system of the invention or that employs a monitoring method of the invention.

The invention provides a system that can continuously check the squeeze force being applied by a tensioner to an elongate product such as a pipeline being laid. The system can work with any kind of tensioner system that employs tracks with a free-wheel mode.

The squeeze force control system of the invention uses reaction forces to measure directly the squeeze force applied locally to a pipe per track length. In this way, it is possible automatically to determine the effects of track compression against the pipe and also the allowable squeeze force tolerance.

The invention operates in the context of a system of tracks comprising pads and link chains that can rotate around upper and lower castings of a chassis. In that context, the invention aims to control squeeze forces by monitoring the principal points of contact or the interface area between the track and the pipe. To do so, the invention employs a stable element that is fixed relative to the chassis, in particular an axial roller pin, rod or shaft that serves as an axle or spindle for a roller. Thus, the principle of the invention is to measure the reaction force applied by a squeeze cylinder to a clamped pipe by checking reaction forces experienced by one or more rollers of a track body.

The roller shafts are static and do not rotate; only the rollers rotate around the roller shafts, guided by bearings. The reaction forces induced by clamping are sustained by members of the track body or chassis that receive the roller shafts in respective holes or bearings.

The invention can be implemented by replacing a roller or a roller shaft with a load pin that is arranged to measure normal loads and that continuously monitors the squeeze force applied by the tensioner. As noted above, the load borne by each pin is typically expected to be in the order of thirty metric tons.

It is possible to replace from one roller shaft to all roller shafts of a track assembly with load pins in accordance with the invention. The number of roller shafts replaced by load pins may vary. It is necessary to adapt calculations to the number of such shafts in order to monitor the squeeze force and to provide inputs to a SCADA system.

The invention makes it possible to check squeeze load tolerance automatically and continuously and to measure, check and control the squeeze force continuously and directly along the track length. The invention also makes it possible to determine the distribution of squeeze force along the track body. This information may, for example, be used to determine deviations in the outer diameter of a pipeline by measuring increments of load through the tensioner system.

The invention enables a monitoring system to be sensitive enough to measure loads near tensioner limits more precisely, including loads under fifty metric tons. The sensitivity allowed by the invention also facilitates monitoring of alignment between two or more tracks of a tensioner, where loads that differ between one track and another may indicate that the tensioner and/or the pipeline are not properly aligned.

The invention also helps to obtain a pipeline diameter reading indirectly, derived from the squeeze force and the geometry of the tensioner system.

As the roller shafts can be fixed and so will not move relative to a supporting chassis, signals representing squeeze forces may be conveyed by wires or cables instead of relying upon WiFi or other wireless communications. Similarly, it is simple to provide electrical power to the fixed roller shafts from a single source rather than using multiple individual batteries. However, wireless communication remains possible and is not excluded from the scope of the invention.

As noted above, a pre-existing tensioner can easily be retro-fitted to be reconfigured in accordance with the invention. Retro-fitting simply involves swapping one or more roller shafts for a load pin with the same dimensions, implementing additional load control system cables or WiFi close to each track body, and then customising the SCADA system to enable that system to monitor loads sensed by the load pins.

Embodiments of the invention implement a method to monitor a track tensioner during a pipe laying operation, the method comprising: mounting at least one load pin in the shaft of a roller of each track; and monitoring the values measured by the load pins.

Embodiments of the invention also provide a monitoring system for a pipe-laying tensioner, the system comprising at least one instrumented roller per track, the or each instrumented roller comprising a load pin in its shaft.

Load pins may communicate with a control system by cable or wirelessly. The control system may be a tensioner control system that provides for automated squeeze pressure adjustment and alarms. It is possible to adapt a commercial load pin for the purposes of the invention, with the same dimensions as a roller shaft that it replaces.

To put the invention into its context, reference has already been made to FIGS. 1 to 3 of the accompanying drawings, in which.

In order that the invention may be more readily understood, reference will now be made, by way of example, to the remainder of the accompanying drawings in which.

Figure 4:
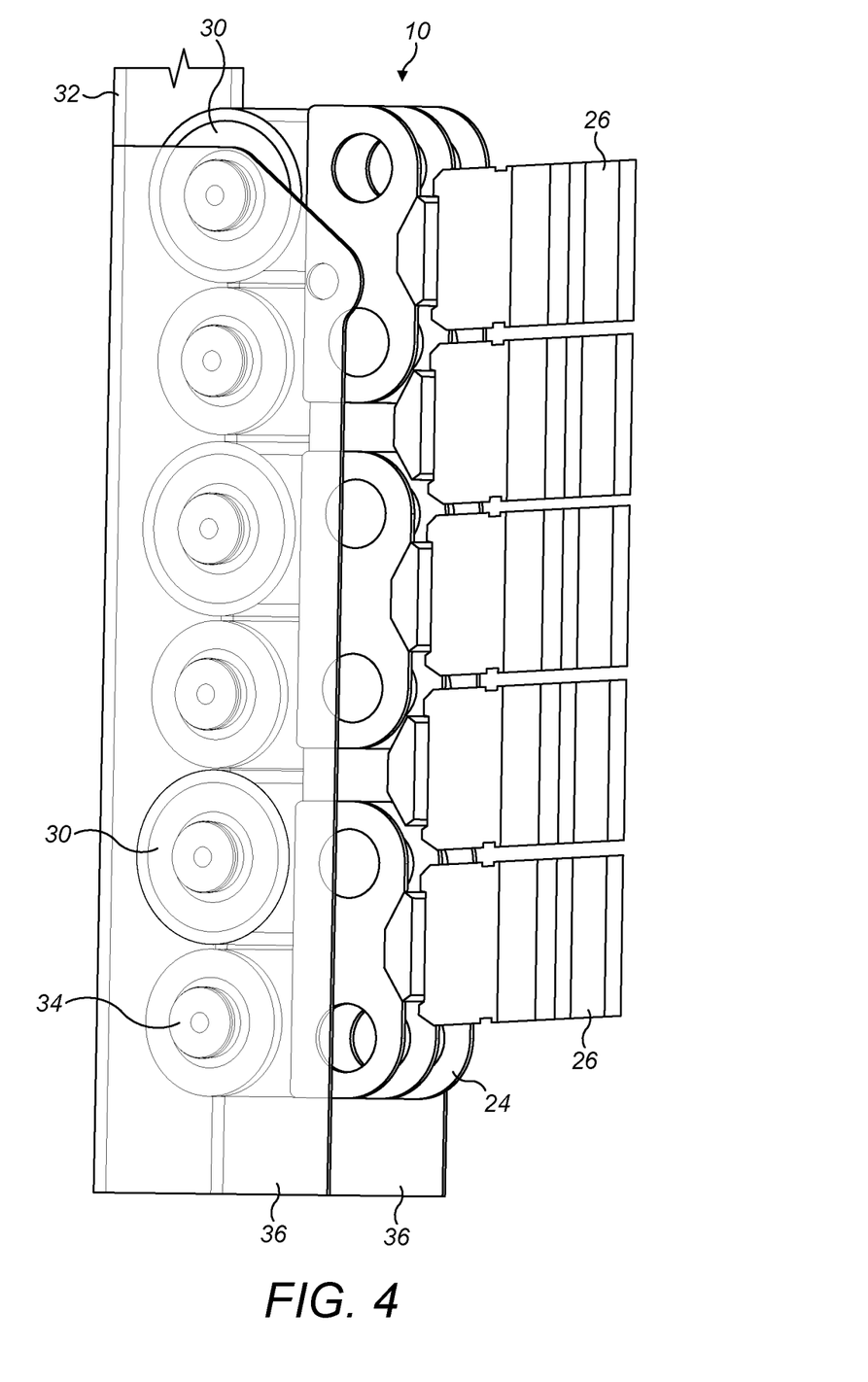
FIG. 4 is a perspective view corresponding to FIG. 3.
Figure 5:
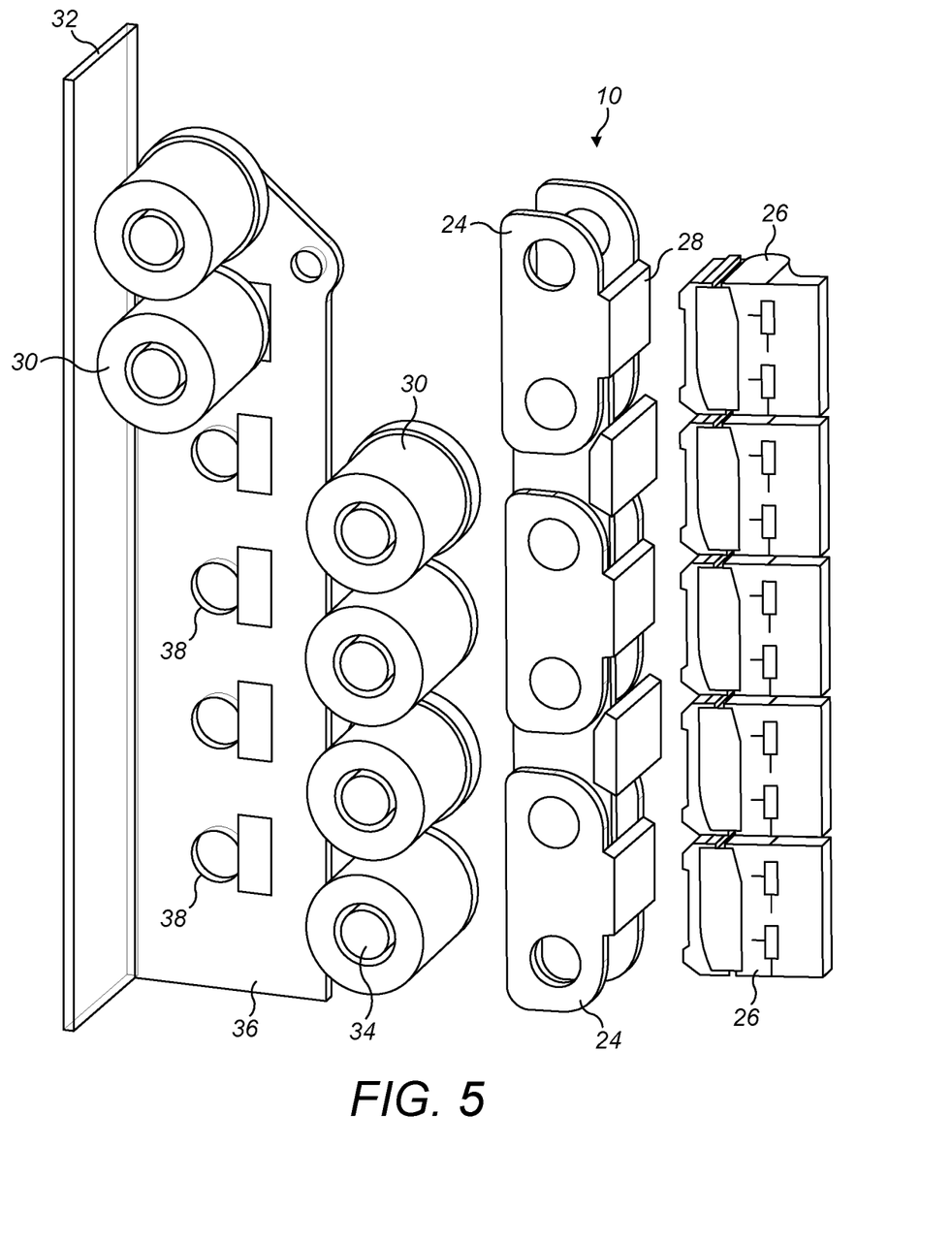
FIG. 5 is a part-sectional exploded perspective view corresponding to FIG. 4.
Figure 6:
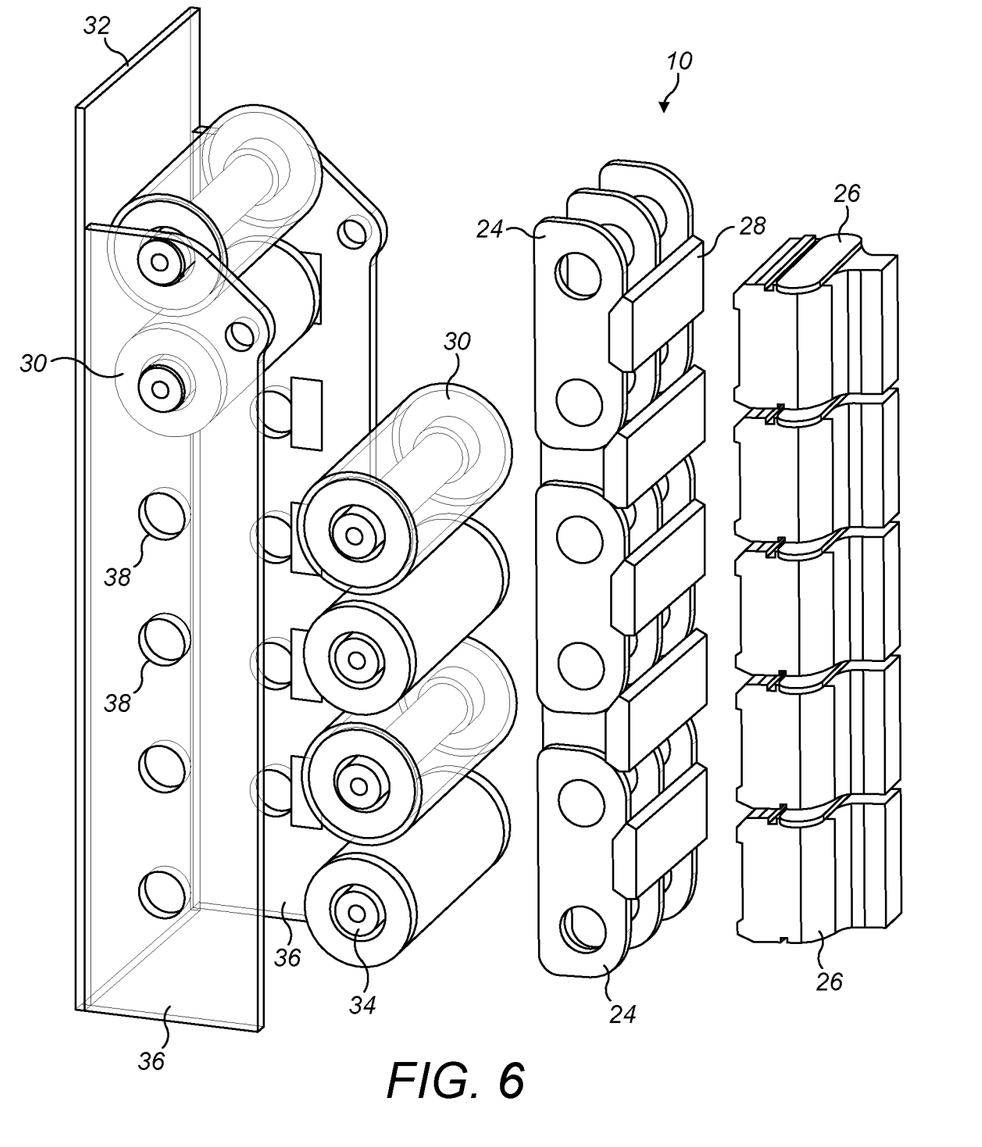
FIG. 6 is an exploded perspective view corresponding to FIG. 5 but showing further detail of the rollers.

Referring now to FIGS. 4 to 6 of the drawings, a tensioner comprises a track body 32 that supports an array of rollers 30. The rollers 30 of the array, in turn, support a track 10 that comprises a chain of articulated links 24, each having a back plate 28 that supports a respective pad 26.

The invention may be used with a variety of tensioner track designs depending on the diameter of the elongate product being laid and its stiffness, structure and composition, in particular whether a pipeline is rigid or flexible. For example, a V-shaped pad assembly, in which each back plate carries two pads in intersecting planes, is common and may be an alternative to a discrete or unique pad on each back plate.

The rollers 30 of the array turn on parallel and co-planar axes around respective pins, axles or shafts 34 that serve as spindles. The rollers 30 are tubular, each defining a central lumen that receives one of the shafts 34 coaxially. FIG. 6 shows alternating ones of the rollers 30 in outline to show the shafts 34 extending within them.

As can be seen in FIGS. 4 and 6, the shafts 34 are supported at their opposed ends by mutually-spaced, parallel walls 36 of the track body 32. The shafts 34 extend orthogonally with respect to the walls 36 to bridge the gap between the walls 36. FIGS. 5 and 6 show that each of the walls 36 is penetrated by a corresponding array of holes 38 that serve as sockets to receive respective ends of the shafts 34.

The walls 36 are exemplified here by continuous walls 36 that are integral with the track body 32. However, the walls could be interrupted by gaps to form longitudinally-successive wall sections or wall portions, each supporting one end or both ends of the shafts 34. Also, the wall sections could be discrete components that are fixed to the track body 32.

The length of each shaft 34 slightly exceeds the spacing between the walls 36 of the track body 32. Consequently, each end of each shaft 34 fits into and extends through a respective one of the holes 38 in the walls 36.

Figure 7:
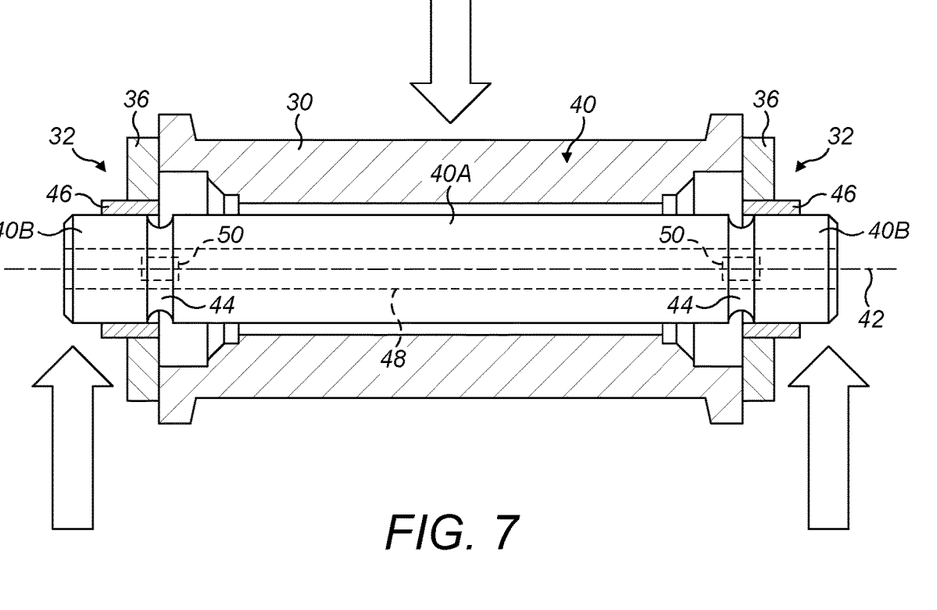
FIG. 7 is a longitudinal sectional view of one of the rollers surrounding a load pin in accordance with the invention.

FIG. 7 shows that, in accordance with the invention, at least one of the shafts 34 may contain, or be replaced by, a load pin 40.

The load pin 40 is fixed relative to the track body 32 such that the associated roller 30 turns around and relative to the load pin 40. Thus, the shape of the load pin 40 is rotationally symmetrical about a central longitudinal axis 42 that also serves as the axis of rotation of the roller 30 that surrounds the load pin 40.

The load pin 40 is cylindrical with constant circular cross-section along its length, save for circumferential grooves 44 that encircle the load pin 40 inboard of its ends, in planes orthogonal to the central longitudinal axis 42. A central portion 40A of the load pin 40, inboard of the grooves 44, extends between the parallel walls 36 of the track body 32 and supports the surrounding roller 30.

The length of the load pin 40 exceeds the spacing between the parallel walls 36 of the track body 32. End portions 40B of the load pin 40 protruding from opposed ends of the surrounding roller 30, outboard of the grooves 44, extend longitudinally outwardly through the holes 38 in the walls 36 and are fixed to the track body 32 by socket formations 46.

The grooves 44 of the load pin 40 are aligned longitudinally with the interface between the inner sides of the walls 36 and the outer ends of the roller 30. The grooves 44 define shear planes and concentrate shear forces acting on the load pin 40 in use, in directions orthogonal or normal to the central longitudinal axis 42. Those shear forces arise from squeeze forces that act on the end portions 40B of the load pin 40 via the walls 36 of the track body and the corresponding reaction force that acts on the central portion 40A of the load pin 40 via the surrounding roller 30.

A narrow bore 48 extends longitudinally through the load pin 40, centred on the central longitudinal axis 42. The bore 48 accommodates strain gauges 50 in longitudinal alignment with the grooves 44. The strain gauges 50 are positioned and arranged to sense shear deformation of the load pin 40 around the grooves 44, and hence to produce load signals that indicate the squeeze force applied by that particular roller 30.

Figure 8:
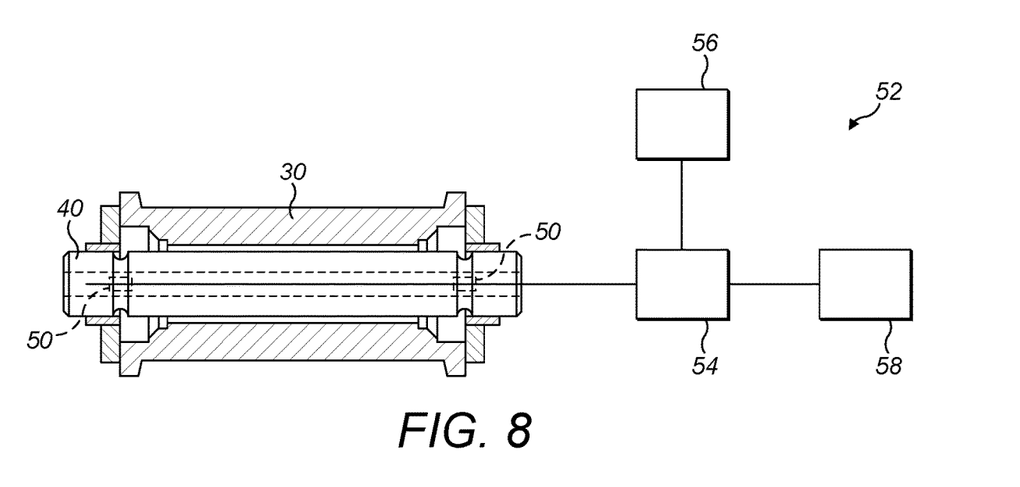
FIG. 8 is a schematic side view of the load pin within the roller of FIG. 7, connected to a sensing and control circuit.

FIG. 8 shows a circuit 52 that connects the strain gauges 50 of the load pin 40 to a processor 54 for processing load signals from the strain gauges 50. The processor 54 outputs processed signals to a tensioner control system 56 that, in turn, responds to those signals and/or provides corresponding outputs, such as displays and alarms, to system supervisors. The circuit 52 further comprises a source 58 of electrical power that powers the processor 54 and applies a voltage across the strain gauges 50. Advantageously, the strain gauges 50 can be hard-wired to other components of the circuit 52 because the load pin 40 can remain stationary while the roller 30 rotates about the load pin 40. The other components of the circuit 52 can also be hard-wired to each other, or signals could be communicated between them wirelessly.

Conveniently, the strain gauges 50 of two or more load pins 40 of an array of rollers 30 can feed signals to a single processor 54.

Figure 9:
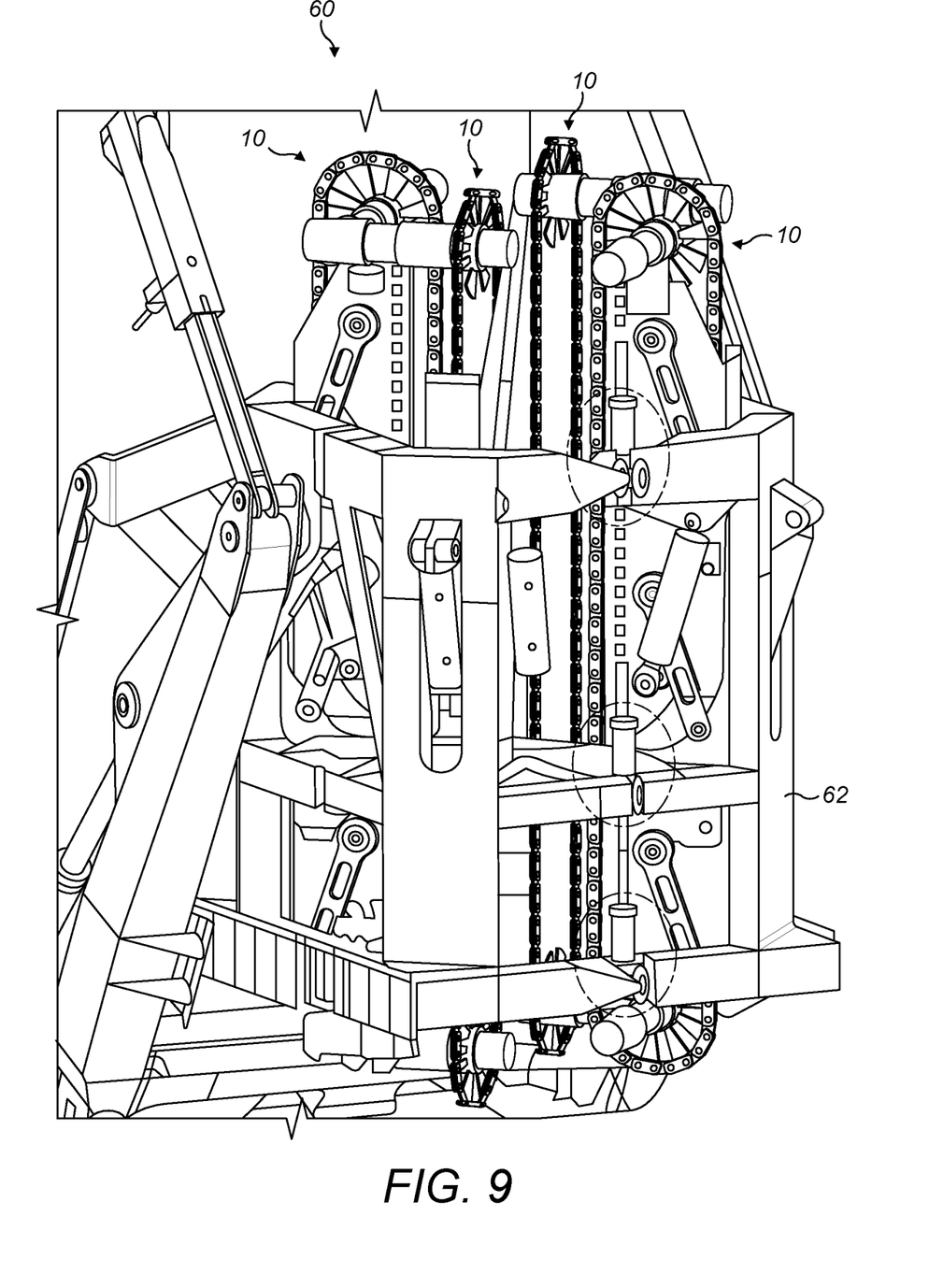
FIG. 9 is a perspective view of a tensioner showing possible locations for auxiliary load pins.

Turning finally to FIG. 9, this shows a tensioner system 60 with four tracks 10 in mutually-opposed pairs, the tracks 10 being equi-angularly spaced around a vertical firing line. One or more of the tracks 10 may be equipped with at least one load pin 40 in its array of supporting rollers 30 as described above.

The tracks 10 are supported by a frame 62. The circles in FIG. 9 show possible locations where additional pins could be mounted on the frame 62 to provide alternative load measurements for the purpose of validation or verification of the overall squeeze force.

Secondary locking and reaction pins such as these on the frame 62 may be adopted to measure the squeeze force, and for alternative confirmation purposes. In particular, acquiring load measurements from secondary pins may be used for validation of load measurements acquired using the above-mentioned methodology involving load pins 40 placed within supporting rollers 30.

The invention claimed is:

1. A tensioner system for holding-back elongate products being laid into water, the system comprising:
   at least one endless circulatory track; and
   an array of rollers supporting the or each track, each of the rollers of the array being mounted for rotation on a respective shaft;
   wherein:
   two or more of the shafts each comprise a respective load pin that is arranged to sense loads applied to a surrounding roller of the array in directions normal to an axis of rotation of that roller;
   the load pins feed respective load signals to a processor;
   the shafts are supported by a chassis structure;
   the chassis structure is supported by a frame; and
   the shafts and each load pin are fixed relative to the chassis structure and the frame.

2. The system of claim 1, wherein each load pin extends between mutually-spaced walls of the chassis structure and protrudes outwardly beyond interfaces between the surrounding roller and the walls, at opposed ends of that roller.

3. The system of claim 2, wherein each load pin comprises circumferential grooves aligned with the interfaces between the surrounding roller and the walls.

4. The system of claim 2, wherein each load pin comprises strain gauges aligned with the interfaces between the surrounding roller and the walls.

5. The system of claim 4, wherein the strain gauges are disposed within a bore that extends longitudinally along each load pin.

6. The system of claim 1, wherein each load pin is hard-wired to the processor that is arranged to process load signals from the load pin and to output the processed signals to a tensioner control system.

7. The system of claim 6, wherein the processor is integrated with, or hard-wired to, the tensioner control system.

8. An installation vessel comprising the tensioner system of claim 1.

9. A method of monitoring a tensioner system when holding-back elongate products being laid into water, the method comprising:

sensing individual loads applied to an array of multiple rollers that supports and extends along an endless circulatory track, the loads being applied in directions normal to an axis of rotation of that roller, wherein the loads are sensed and a respective load signal is produced by a load pin on which each roller is mounted for rotation; and advancing the track while each roller rotates and each load pin remains in fixed relation to a supporting chassis structure and a frame supporting the chassis structure.

10. The method of claim 9, comprising applying shear forces to each load pin by virtue of force applied to a central portion of the load pin and opposing forces applied to end portions of the load pin.

11. The method of claim 10, wherein the force applied to the central portion of each load pin is applied by the surrounding roller.

12. The method of claim 10, wherein the opposing forces applied to the end portions of each load pin are applied by mutually-spaced supporting formations.

13. The method of claim 9, comprising conveying load signals from each load pin to a processor through a wired connection, processing the load signals and outputting the processed signals to a tensioner control system.

14. The method of claim 13, comprising outputting the processed signals to the tensioner control system through a wired connection.

15. The method of claim 9, comprising recording the individual loads to determine a distribution of squeeze forces along the track.

16. The method of claim 9, comprising recording the individual loads to determine deviations in the outer diameter of a product passing through the tensioner system while being laid.

17. A tensioner system for holding-back elongate products being laid into water, the system comprising:

at least one endless circulatory track; and an array of rollers supporting the or each track, each of the rollers of the array being mounted for rotation on a respective shaft;

wherein:

two or more of the shafts each comprise a respective load pin that is arranged to sense loads applied to a surrounding roller of the array in directions normal to an axis of rotation of that roller;

the load pins feed respective load signals to a processor;

the shafts are supported by a chassis structure;

each load pin is fixed relative to the chassis structure;

the chassis structure is supported by a frame; and the frame incorporates one or more additional load pins arranged to act between the frame and the chassis structure to sense loads applied to the frame.

* * * * *